(12) United States Patent
Uenodai et al.

(10) Patent No.: US 7,177,736 B2
(45) Date of Patent: Feb. 13, 2007

(54) CONTROL DEVICE FOR FUEL CELL VEHICLE

(75) Inventors: Asao Uenodai, Wako (JP); Shinji Yoshikawa, Wako (JP); Kenichiro Kimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 752 days.

(21) Appl. No.: 10/171,107

(22) Filed: Jun. 12, 2002

(65) Prior Publication Data

US 2002/0188395 A1   Dec. 12, 2002

(30) Foreign Application Priority Data

Jun. 12, 2001   (JP) ............................. 2001-176545
May 15, 2002   (JP) ............................. 2002-139729

(51) Int. Cl.
*B60L 11/18*   (2006.01)

(52) U.S. Cl. ............................. 701/22; 429/22; 429/23; 180/65.3; 180/65.8

(58) Field of Classification Search .................. 701/22; 180/65.1–65.3, 65.8; 429/22, 23
See application file for complete search history.

(56) References Cited

U.S. PATENT DOCUMENTS

| | | | |
|---|---|---|---|
| 6,684,135 B2 * | 1/2004 | Uenodai et al. ............... | 701/22 |
| 6,691,810 B2 * | 2/2004 | Hasuka et al. ............. | 180/65.3 |
| 6,899,968 B2 * | 5/2005 | Hasuka et al. ................ | 429/23 |
| 2003/0008188 A1 * | 1/2003 | Aoyagi et al. ................ | 429/23 |
| 2004/0136211 A1 * | 7/2004 | Itou ............................. | 363/37 |

* cited by examiner

*Primary Examiner*—Gary Chin
(74) *Attorney, Agent, or Firm*—Lahive & Cockfield, LLP; Anthony A. Laurentano, Esq.

(57) ABSTRACT

The present invention intends to provide a control device for a fuel cell vehicle which suppresses the deterioration of driveability upon acceleration without increasing the size of a driving electric motor or a motor driver. When a requested output (PD_CAL) exceeds a first output limit determined depending on a continuous output rating of an electric motor 10 or a motor driver 5 and an increasing rate of the requested output (PD_CAL) exceeds a reference increasing rate, an upper-limit target output determining unit 52 determines an assist time used as a time during which the electric motor 10 can be operated continuously by the requested output (PD_CAL) on the basis of the requested output (PD_CAL) and an open-circuit voltage (Vcap_o) of a capacitor 3. Until the assist time is elapsed, the upper-limit target output (PD_LMT) is set to a second output limit (>the first output limit) determined depending on a short-time output rating of the electric motor 10 or the motor driver 5.

2 Claims, 6 Drawing Sheets

CONTROL DEVICE FOR FUEL CELL VEHICLE

BACKGROUND OF THE INVENTION

1. Field of the Invention

The present invention relates to a control device for a fuel cell vehicle using a fuel cell and an electric double layer capacitor, which are connected parallel to each other, as a power supply for a driving electric motor. Particularly, the invention relates to a control of an output of the electric motor.

2. Description of the Related Art

As a control device, mounted on a fuel cell vehicle, for controlling a driving electric energy supplied to a driving electric motor for the fuel cell vehicle, for example, a control device constituted as shown in FIG. 6 is known.

The control device shown in FIG. 6 has a motor driver 101 for supplying a driving electric energy to a driving electric motor 100 and a fuel cell 102 functioning as a power supply for an electric accessory such as an air-conditioner (not shown). The control device is constituted in the following manner. An electric double layer capacitor 103 is connected parallel to the fuel cell 102. If a response from a reactive gas supply unit 104 such as an air-conditioning compressor for supplying reactive gases to the fuel cell 102 is delayed and the reactive gases supplied to the fuel cell 102 are insufficient to cause a shortage of the amount of electric energy generated by the fuel cell 102, the shortage is compensated with an electric energy discharged from the electric double layer capacitor 103.

The motor driver 101 supplies a driving electric energy depending on a torque command (TRQ_CMD) which is generated from an electric vehicle control unit 105 to the electric motor 100. The reactive gas supply unit 104 regulates the rate at which the reactive gases are supplied to the fuel cell 102 so as to obtain the amount of generated electric energy depending on a target output (PD_REQ) of the electric motor 100, the target output being calculated by a target output calculator 106.

In this instance, the target output calculator 106 calculates the target output (PD REQ) of the electric motor 100 fundamentally on the basis of a requested output (PD_CAL) of the electric motor 100 determined depending on the rotational speed (Nm) of the electric motor and the amount of depression (Ap) of an accelerator pedal.

However, when the requested output (PD_CAL) exceeds a continuous output rating (PD_LMT) of the motor driver 101 or the electric motor 100, the target output calculator 106 limits the target output (PD_REQ) to the continuous output rating (PD_LMT) or lower to calculate the target output, thereby preventing the motor driver 101 or the electric motor 100 from running over the continuous output rating (PD_LMT). A torque command calculator 107 calculates the torque command (TRQ_CMD) for the motor driver 101 depending on the target output (PD_REQ). Consequently, the output of the electric motor 100 is suppressed to the continuous output rating (PD_LMT) or lower.

Therefore, when the driver of the fuel cell vehicle depresses the accelerator pedal in order to accelerate the fuel cell vehicle, the output of the electric motor 100 is suppressed to the continuous output rating or lower and a sensation of acceleration that the driver desires is not derived. The driveability may deteriorate. In order to prevent the driveability from deteriorating, the adoption of the motor driver 101 or the electric motor 100 with a higher continuous output rating is considered. In this case, there are the following disadvantages. Since the size of the motor driver 101 or the electric motor 100 is increased, a space for installation therefor is also increased. The cost of the motor driver 101 or the electric motor 100 also increases.

SUMMARY OF THE INVENTION

The present invention is made in order to solve the above disadvantages. It is an object of the present invention to provide a control device for a fuel cell vehicle which suppresses the deterioration of driveability upon acceleration without increasing the size of a driving electric motor or a motor driver.

According to the present invention, there is provided a control device for a fuel cell vehicle, comprising motor-requested-output determining means for determining a requested output for a driving electric motor, motor-target-output calculating means for calculating a target output of the electric motor while limiting the target output to a predetermined upper-limit target output or lower depending on the requested output, motor driving means for outputting a driving electric energy depending on the target output to the electric motor, a fuel cell which is used as a power supply for the motor driving means, an electric double layer capacitor which is connected parallel to the fuel cell so as to be charged by the fuel cell and to be discharged for compensation for the insufficient amount of generated electric energy when the amount of electric energy generated by the fuel cell is insufficient, reactive gas supply means for supplying reactive gases at a rate depending on the target output to the fuel cell.

The control device further includes capacitor-charged-amount recognizing means for recognizing the amount of electric energy charged into the electric double layer capacitor, and assist-time calculating means for calculating an assist time used as a time during which the electric motor can be operated continuously by the requested output on the basis of the requested output and the amount of electric energy charged into the electric double layer capacitor in an abruptly increasing state of the requested output in which the requested output exceeds a first output limit and an increasing rate of the requested output exceeds a predetermined reference increasing rate, the first output limit being determined in accordance with a continuous output rating of the electric motor or the motor driving means. When the requested output is not in the abruptly increasing state, the motor-target-output calculating means sets the first output limit to the upper-limit target output, and when the requested output is in the abruptly increasing state, the motor-target-output calculating means sets a second output limit larger than the first output limit to the upper-limit target output within the assist time, the second output limit being determined in accordance with a short-time output rating of the motor driving means or the electric motor.

According to the present invention, the continuous output rating means an output which can be continuously generated from the electric motor or an electric energy which can be continuously generated from the motor driving means to the electric motor. The smaller one of the output and the electric energy specifies the maximum output which can be continuously extracted from the electric motor.

The short-time output rating means an output which can be obtained from the electric motor within a first fixed time or an electric energy which can be generated from the motor driving means to the electric motor within a second fixed time. An output which can be obtained from the electric motor within a short time (the first fixed time or the second fixed time) is determined in accordance with the smaller one of the output and the electric energy.

When the requested output is in the abruptly increasing state, the motor-target-output calculating means sets the second output limit larger than the first output limit within the assist time. Therefore, after the abruptly increasing state of the requested output, an output exceeding the first output limit can be generated from the electric motor by the electric energy discharged from the capacitor within the assist time. Consequently, in the abruptly increasing state of the requested output, the deterioration of driveability caused by a shortage of the output of the electric motor can be suppressed.

When the upper-limit target output is returned from the second output limit to the first output limit immediately after the assist time, the target output calculated by the motor-target-output calculating means decreases abruptly and the output of the electric motor is also lowered abruptly in association with the abrupt decrease. As a result, the motion of the fuel cell vehicle becomes unstable.

Accordingly, the motor-target-output calculating means reduces the upper-limit target output to the first output limit at a predetermined decreasing rate after the assist time has passed. Consequently, the output of the electric motor is prevented from abruptly decreasing after the assist time and the upper-limit target output can be returned to the first output limit.

DESCRIPTION OF THE PREFERRED EMBODIMENT

Figure 1:
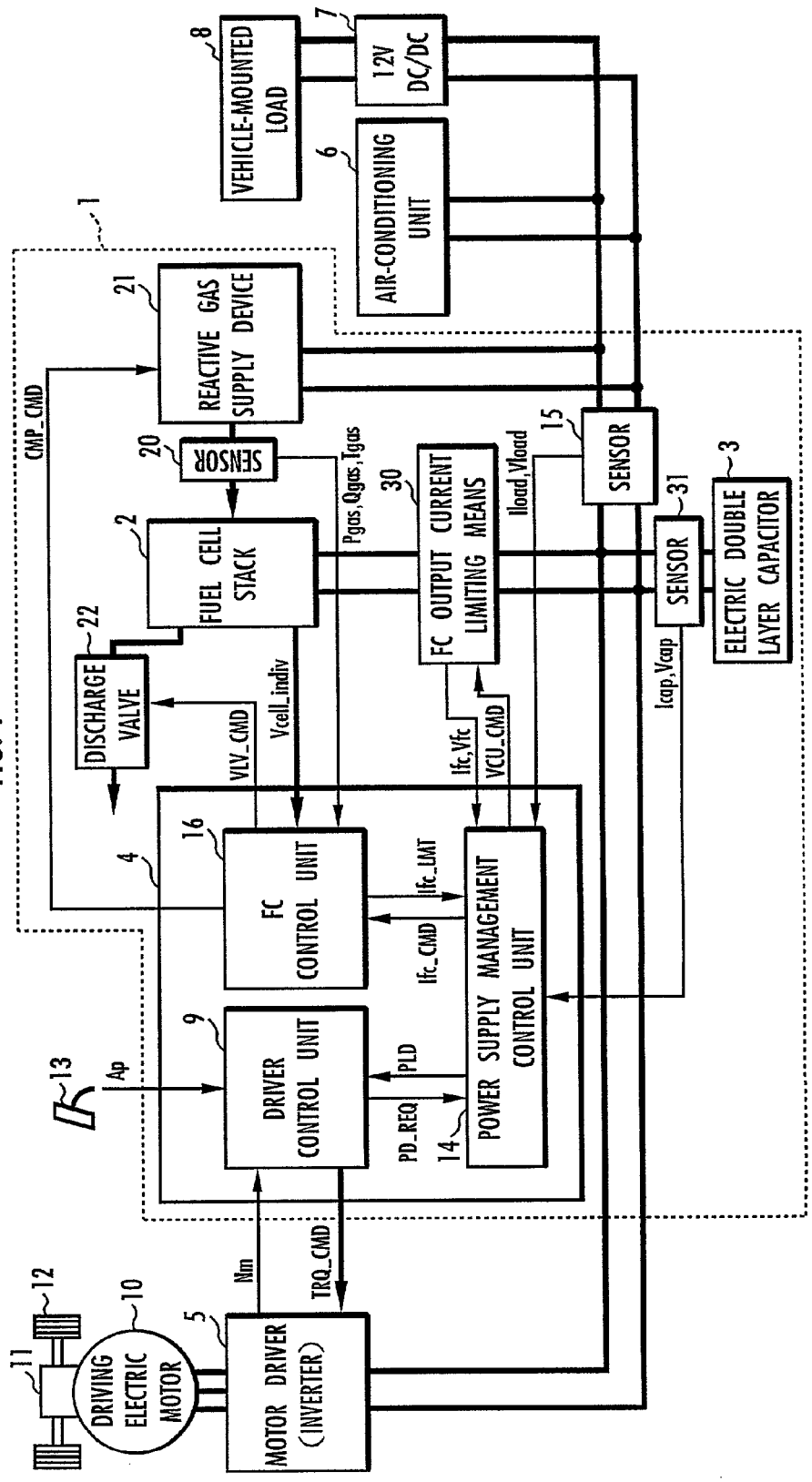
FIG. 1 is a block diagram showing the configuration of a control device for a fuel cell vehicle according to the present invention.
Figure 2:
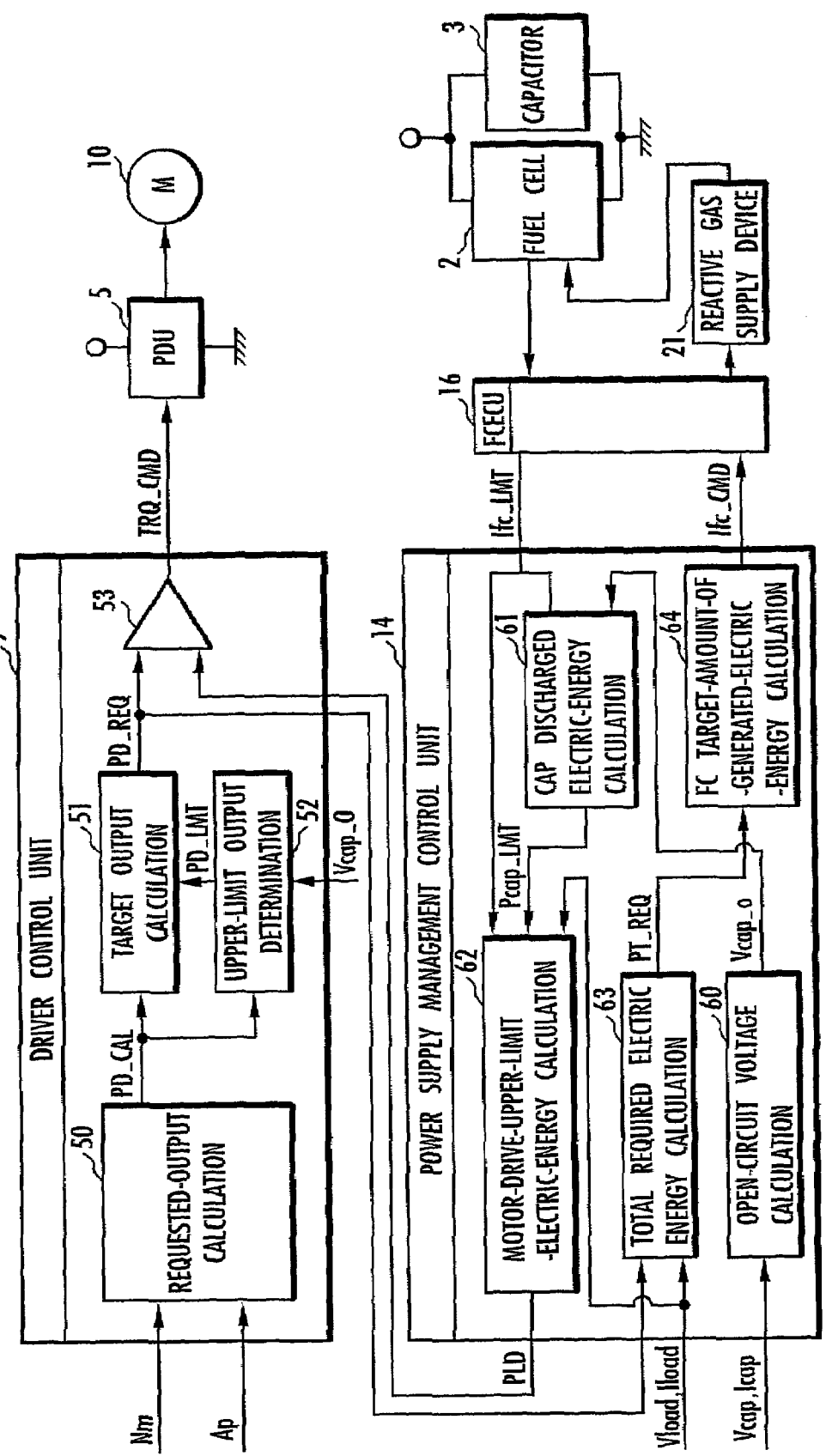
FIG. 2 is a block diagram showing the control arrangement of the control device shown in FIG. 1.
Figure 3:
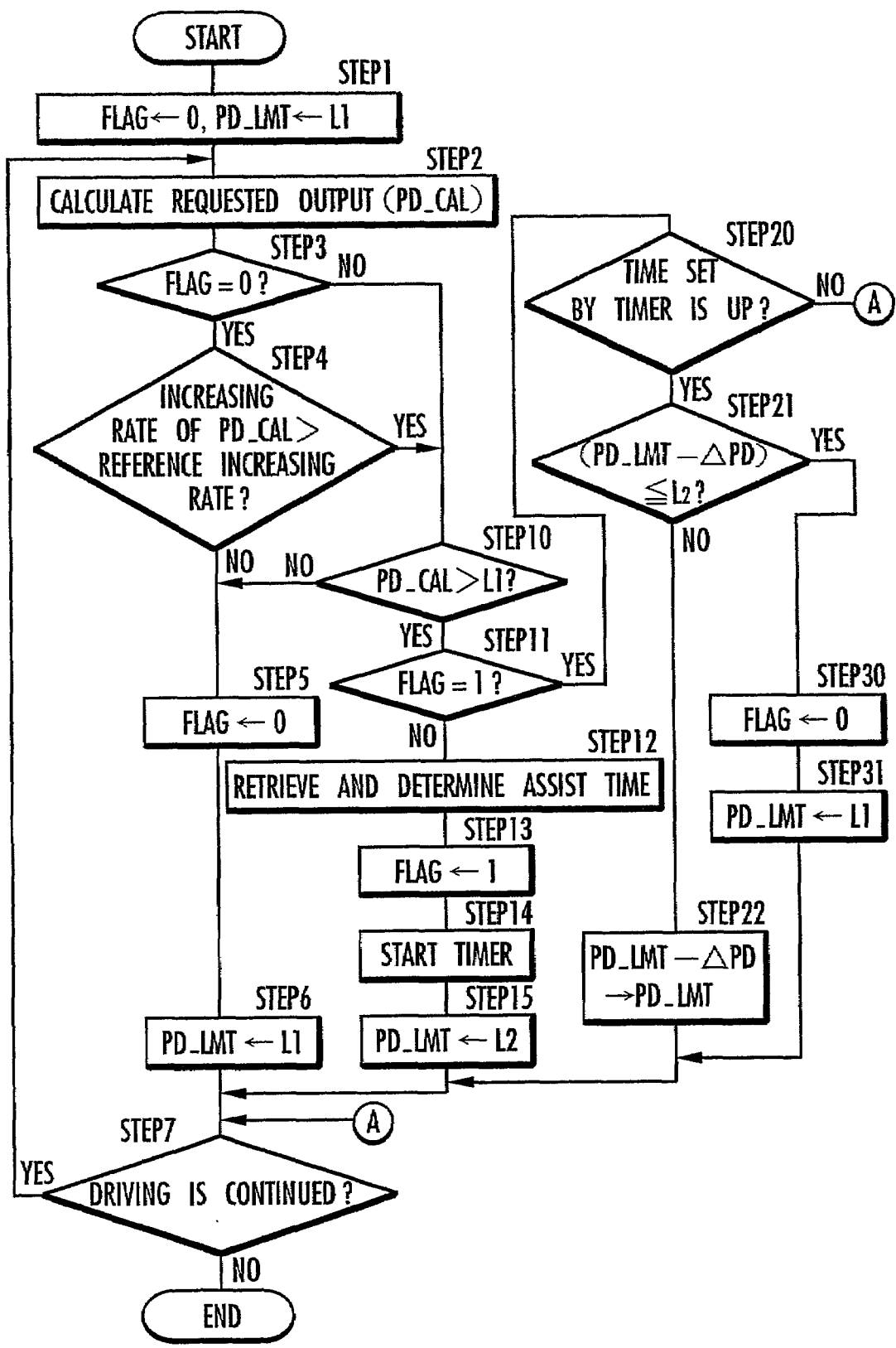
FIG. 3 is a flowchart showing the operation of a driver control unit.
Figure 4:
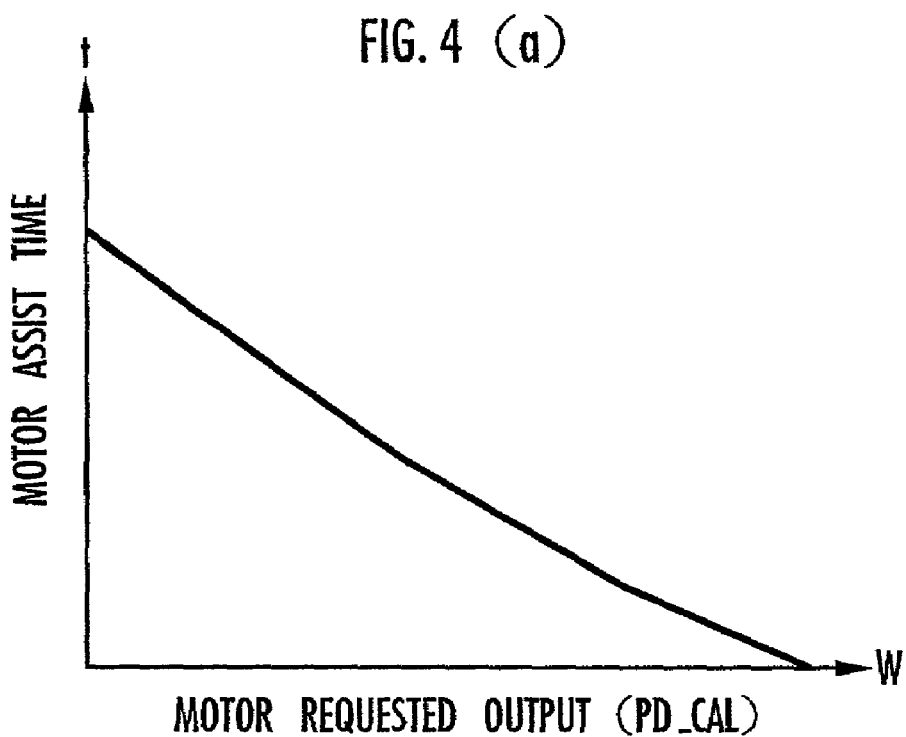
FIGS. 4A and 4B are graphs to determine an assist time.
Figure 4:
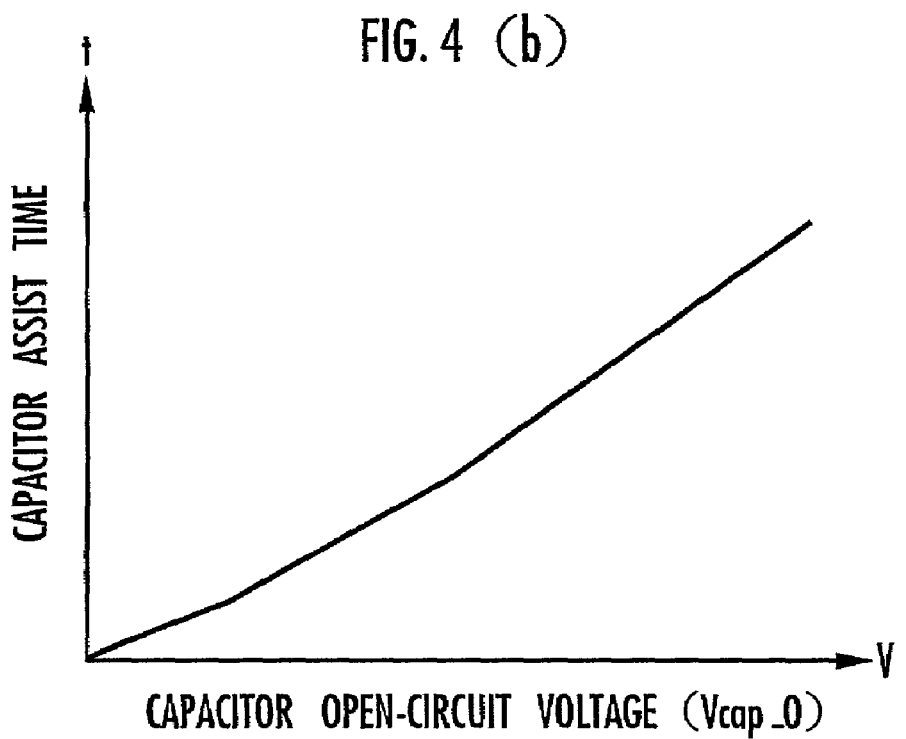

An embodiment of the present invention will now be described with reference to FIGS. 1 to 5. FIG. 1 is a block diagram showing the configuration of a control device for a fuel cell vehicle according to the present invention, FIG. 2 is a block diagram showing the control arrangement of the control device shown in FIG. 1, FIG. 3 is a flowchart showing the operation of a driver control unit shown in FIG. 2, FIGS. 4A and 4B are correlation graphs to determine an assist time, and FIG. 5 includes time series graphs showing the operation and the state of the control device during the assist time and before and after the assist time.

Referring to FIG. 1, a control device 1 for a fuel cell vehicle (hereinbelow, simply referred to as a control device 1) according to the present invention is mounted on a fuel cell vehicle and controls an electric energy supplied to the fuel cell vehicle. A controller 4 controls the operation of the control device 1. The controller 4 comprises a microcomputer, a memory, and other components.

A fuel cell 2 outputs an electric current based on an electrochemical reaction between reactive gases of hydrogen and air. The amount of electric energy generated by the fuel cell 2 is controlled by a power supply management control unit 14 and a fuel cell control unit 16 which are provided for the controller 4. A driver control unit 9 provided for the controller 4 determines a torque command to a driving electric motor 10 (hereinbelow, simply referred to as an electric motor 10).

An output electric energy produced by the fuel cell 2 and an electric double layer capacitor 3 (hereinbelow, simply referred to as a capacitor 3) is supplied to a motor driver 5 (corresponding to motor driving means according to the present invention), an air-conditioning unit 6, and a 12-V load 8 through a DC/DC converter 7. The motor driver 5 controls currents flowing through armatures of the electric motor 10 depending on a torque command (TRQ_CMD) outputted from the driver control unit 9. A drive power generated by the electric motor 10 is transferred to drive wheels 12 through a transmission 11.

The driver control unit 9 outputs a signal indicative of a target output (PD_REQ) of the electric motor 10, the output being calculated based on the amount of depression (Ap) of an accelerator pedal 13 and the rotational speed (Nm) of the electric motor 10, to the power supply management control unit 14.

The power supply management control unit 14 is supplied with detected signals of a load current (Iload) and a load voltage (Vload) which are detected by a load sensor 15 in order to recognize the electric energy consumed by electric accessories other than the electric motor 10. The power supply management control unit 14 recognizes the electric energy consumed by the electric accessories other than the electric motor 10 on the basis of the detected signals.

In consideration of an upper limit amount of generated electric energy (Ifc_LMT) outputted from the fuel cell control unit 16 and indicative of an upper limit amount of electric energy generated by the fuel cell 2, a current (Icap) charged into and discharged from the capacitor 3, and a voltage (Vcap) across the capacitor 3, the current (Icap) and the voltage (Vcap) being detected by a capacitor sensor 31, the power supply management control unit 14 determines a target amount of generated electric energy (Ifc_CMD) which is a target value for a current outputted from the fuel cell 2 depending on the sum of the target output (PD_REQ) of the electric motor 10 and the electric energy consumed by the electric accessories other than the electric motor 10, and then outputs a signal indicative of the target amount of generated electric energy (Ifc_CMD) to the fuel cell control unit 16.

The power supply management control unit 14 outputs a signal indicative of an output limit electric energy (PLD) representing an upper limit of the electric energy that can be supplied from the fuel cell 2 and the capacitor 3 to the motor driver 5, to the driver control unit 9.

The detected signals outputted from a reactive gas sensor 20 and indicating a pressure (Pgas), a flow rate (Qgas), and a temperature (Tgas) of reactive gases (hydrogen and air) supplied to the fuel cell 2, and detected signals indicative of states (Vcell_indiv) of individual fuel cells (not shown) that make up the fuel cell stack are inputted to the fuel cell control unit 16. The fuel cell control unit 16 determines the upper limit amount of generated electric energy (Ifc_LMT) in consideration of the state of the fuel cell 2 as recognized from these detected signals.

The driver control unit 9 outputs the torque command (TRQ_CMD) to the motor driver 5 so that the electric energy consumed by the electric motor 10 and the motor driver 5 does not exceed the output limit electric energy (PLD)

indicated by the power supply management control unit 14. The motor driver 5 controls the armature currents of the electric motor 10 to cause the electric motor 10 to generate a torque depending on the torque command (TRQ_CMD).

The fuel cell control unit 16 outputs a signal indicative of a target amount of reactive gases (CMP_CMD) supplied to the fuel cell 2 to a reactive gas supply device 21 (corresponding to reactive gas supply means according to the present invention) so that the fuel cell 2 will output a current for the target amount of generated electric energy (Ifc_CMD) outputted from the power supply management control unit 14. Consequently, the fuel cell 2 is supplied with air and hydrogen at a rate depending on the target amount of generated electric energy (Ifc_CMD).

Hydrogen supplied from the reactive gas supply device 21 is supplied to hydrogen electrodes of the fuel cell 2 through an ejector (not shown) and a humidifier (not shown), reacts electrically and chemically with oxygen in air supplied to air electrodes of the fuel cell 2, producing water which is discharged through a discharge valve 22. The opening of the discharge valve 22 is controlled by a control signal (VLV_CMD) supplied from the fuel cell control unit 16 in order to keep the pressure in the fuel cell 2 at a constant gradient depending on the pressures of the supplied air and hydrogen.

The fuel cell 2 has a water-cooled cooling unit (not shown). The fuel cell control unit 16 controls the rate and temperature of cooling water supplied to the water-cooled cooling unit depending on the temperature of the cooling water supplied to the water-cooled cooling unit and the temperature of the cooling water discharged from the water-cooled cooling unit.

The control device 1 also has output current limiting means 30 (including a function as current limiting means according to the present invention) which has a switching device such as a transistor or an FET in order to limit a current outputted from the fuel cell 2 and detects an output current (Ifc) and an output voltage (Vfc) of the fuel cell 2. The output current limiting means 30 turns on or off the current outputted from the fuel cell 2 depending on a level (high/low) of a current limit signal (VCU_CMD) outputted from the power supply management control unit 14.

Fundamentally excepting the start time and the stop time of the fuel cell 2, the power supply management control unit 14 always sets the current limit signal (VCU_CMD) at a high level to turn on (energize) the output current limiting means, thereby keeping the direct coupling state of the fuel cell 2 and the capacitor 3.

In the direct coupling state, when the total amount of electric energy consumed by the electric motor 10 and the electric accessories other than the electric motor 10 increases, resulting in the decrease of the output voltage of the fuel cell 2, a discharge current depending on a difference between an open-circuit voltage of the capacitor 3 and the output voltage of the fuel cell 2 is supplied to the electric motor 10 and the electric accessories other than the electric motor 10. On the other hand, when the total amount of consumed electric energy is reduced, resulting in the increase of the output voltage of the fuel cell 2, the charged current depending on the difference between the open-circuit voltage of the capacitor 3 and the output voltage of the fuel cell 2 is supplied from the fuel cell 2 to the capacitor 3.

Consequently, in both the cases, the open-circuit voltage of the capacitor 3 becomes equivalent to the output voltage of the fuel cell 2. Therefore, it is unnecessary to always cause the output voltage of the fuel cell 2 to match an open-circuit voltage of a battery by a large DC/DC converter which can switch a heavy current as in the case where the battery is connected parallel to the fuel cell 2. In such a battery, the open-circuit voltage does not change very much even if the remaining amount of charged electric energy changes.

Accordingly, the output current limiting means 30 may have a small switching device to limit the passage of the electric current between the capacitor 3 and the fuel cell 2 at the start time and the stop time of the fuel cell 2, during which the output current of the fuel cell 2 is small.

With the constitution described above, the target amount of reactive gases (CMP_CMD) is controlled so that the fuel cell 2 outputs a current depending on the target amount of generated electric energy (Ifc_CMD) determined based on the electric energy consumed by the electric accessories calculated on the basis of the target output (PD_REQ), the load current (Iload), and the load voltage (Vload) of the electric motor 10.

The driver control unit 9 limits the target output (PD_REQ) of the electric motor 10 so that each of the motor driver 5 and the electric motor 10 does not operate over the rating. The output of the electric motor 10 is lowered in association with the above limiting, suppressing the deterioration of driveability of the fuel cell vehicle. A process of calculating the target output (PD_REQ) of the electric motor 10 by the driver control unit 9 will now be described with reference to FIGS. 2 to 5.

Referring to FIG. 2, the driver control unit 9 comprises a requested-output calculator 50 (corresponding to motor-requested-output determining means according to the present invention), a target output calculator 51 (including a function as motor-target-output calculating means according to the present invention), an upper-limit target output determining unit 52 (including functions as assist time calculating means and motor-target-output calculating means according to the present invention), and a target output limiting unit 53.

The requested-output calculator 50 calculates a requested output (PD_CAL) of the electric motor 10 on the basis of the amount of depression (Ap) of the accelerator pedal 13 (refer to FIG. 1) and the rotational speed (Nm) of the electric motor 10.

The target output calculator 51 calculates the target output (PD_REQ) of the electric motor 10 depending on the requested output (PD_CAL) so as not to exceed an upper-limit target output (PD_LMT) determined by the upper-limit target output determining unit 52.

The upper-limit target output determining unit 52 usually determines a first output limit ($L_1$), which is determined depending on the continuous output rating of the motor driver 5 or the electric motor 10, as the upper-limit target output (PD_LMT). When the requested output (PD_CAL) is increased abruptly, the upper-limit target output determining unit 52 determines a second output limit ($L_2$), which is determined depending on the short-time output rating of the motor driver 5 or the electric motor 10, as the upper-limit target output (PD_LMT).

The target output limiting unit 53 fundamentally determines the torque command (TRQ_CMD) so as to obtain the target output (PD_REQ) from the electric motor 10. When the electric energy needed for the motor driver 5 exceeds the output limit electric energy (PLD) in order to obtain the target output (PD_REQ), the target output limiting unit 53 limits the torque command (TRQ_CMD) so that the electric energy consumed by the motor driver 5 is lower than the output limit electric energy (PLD).

In this instance, in consideration of the electric energy discharged from the capacitor 3, the power supply management control unit 14 calculates the output limit electric energy (PLD). In other words, first, an open-circuit voltage calculator 60 (including a function as capacitor-charged-amount recognizing means according to the present invention) calculates an open-circuit voltage (Vcap_o) of the capacitor 3 on the basis of data indicating an internal resistance (Rcap) of the capacitor 3 stored in a memory, a capacitor voltage (Vcap), and a capacitor current (Icap) using the following equation (1).

$$Vcap\_o = Vcap + Icap \times Rcap \quad (1)$$

When the output voltage of the capacitor 3, namely, the amount of electric energy generated by the fuel cell 2 obtained by applying the upper limit amount of generated electric energy (Ifc_LMT) to electric current/voltage output characteristic map of the fuel cell 2, stored in a memory, is equivalent to the upper limit amount of generated electric energy (Ifc_LMT), a capacitor-discharged-electric-energy calculator 61 calculates an upper-limit discharged electric energy (Pcap_LMT) as an electric energy generated from the capacitor 3 using the following equation (2).

$$Pcap\_LMT = (Vcap\_o - Vfc\_LMT)/Rcap \times Vfc\_LMT \quad (2)$$

A motor-drive-upper-limit-electric-energy calculator 63 subtracts the electric energy (=V_load×I_load) consumed by the electric accessories from the sum of the output electric energy of the fuel cell 2 depending on the upper-limit amount of generated electric energy (Ifc_LMT) and the upper-limit electric energy (Pcap_LMT) discharged from the capacitor 3, thereby calculating the output limit electric energy (PLD). Accordingly, the output limit electric energy (PLD) is set in consideration of the electric energy discharged from the capacitor 3.

The operation of the upper-limit target output determining unit 52 will now be described with reference to the flowchart shown in FIG. 3. When the operation of the driver control unit 9 is started by energizing the controller 4, the upper-limit target output determining unit 52 resets a flag (flag=0) as initialization in STEP 1 and also determines the foregoing first output limit ($L_1$) as the upper-limit target output (PD_LMT).

The subsequent STEP 2 indicates a process by the requested-output calculator 50. As mentioned above, the requested-output calculator 50 calculates the requested output (PD_CAL) of the electric motor 10 on the basis of the amount of depression (Ap) of the accelerator pedal and the like.

The upper-limit target output determining unit 52 checks whether the flag has been set in the next STEP 3. If the flag has not been set (flag=0), STEP 4 follows. The upper-limit target output determining unit 52 checks whether the rate of increase of the requested output (PD_CAL) exceeds the reference rate of increase.

If the increasing rate of the requested output (PD_CAL) exceeds the reference increasing rate, the process branches to STEP 10. When the requested output (PD_CAL) is lower than the first output limit ($L_1$), the process proceeds to STEP 5 and the upper-limit target output determining unit 52 resets the flag. The first output limit ($L_1$) is set to the upper-limit target output (PD_LMT) in STEP 6. If the operation is being continued in STEP 7, the process returns to STEP 2.

Accordingly, in the case where the increasing rate of the amount of depression (Ap) of the accelerator pedal is equal to or lower than the reference increasing rate and the driver of the fuel cell vehicle does not desire abrupt acceleration, such a loop of STEPS 2 to 7 is repetitively executed to keep the upper-limit target output (PD_LMT) at the first output limit ($L_1$).

On the other hand, in the case where the increasing rate of the amount of depression (Ap) of the accelerator pedal exceeds the reference increasing rate in STEP 4, the process branches to STEP 10, and the requested output (PD_CAL) exceeds the first output limit ($L_1$) in STEP 10 (such a state corresponds to the abruptly increasing state of the requested output according to the present invention), the process proceeds from STEP 10 to STEP 11. In this case, since the flag is not yet set, the process proceeds to STEP 12.

In STEP 12, the upper-limit target output determining unit 52 determines an assist time used as a time during which the electric motor 10 can be driven at the target output (PD_REQ) exceeding the first output limit ($L_1$). The upper-limit target output determining unit 52 determines the assist time on the basis of a correlation graph of motor assist time/motor requested output (PD_CAL) shown in FIG. 4A and a correlation graph of capacitor assist time/capacitor open-circuit voltage (Vcap_o) shown in FIG. 4B. Data items of these correlation graphs have been stored in the memory.

In the correlation graph of FIG. 4A, the axis of ordinate (t) denotes the motor assist time and the axis of abscissa (W) denotes the requested output (PD_CAL) of the electric motor 10. The motor assist time indicates a time during which the electric motor 10 can be driven continuously at the requested output (PD_CAL). As the requested output (PD_CAL) of the electric motor 10 becomes higher, the motor assist time becomes shorter.

In the correlation graph of FIG. 4B, the axis of ordinate (t) denotes the capacitor assist time and the axis of abscissa (V) denotes the open-circuit voltage (Vcap_o) of the capacitor 3. The capacitor assist time denotes a time during which a supplementary electric energy can be generated from the capacitor 3 in order to generate an electric energy larger than the first output limit ($L_1$) from the capacitor 3 to the motor driver 5. As the open-circuit voltage (Vcap_o, which varies in proportion to the amount of electric energy charged into the capacitor 3) is larger, namely, as the amount of electric energy charged into the capacitor 3 is larger, the capacitor assist time is longer.

The upper-limit target output determining unit 52 compares the motor assist time obtained by applying the requested output (PD_CAL) to the correlation graph of FIG. 4A with the capacitor assist time obtained by applying the open-circuit voltage (Vcap_o) of the capacitor 3, calculated by the open-circuit voltage calculator 60, to the correlation graph of FIG. 4B, and determines the time shorter than the other time as the assist time.

After the assist time is determined in this manner, the upper-limit target output determining unit 52 sets a flag (flag=1) in STEP 13, a timer which uses the assist time as a set time is started in STEP 14, the upper-limit target output (PD_LMT) is set to the second output limit $L_2$ ($>L_1$) in STEP 15, and the process proceeds to STEP 7.

Consequently, the target output calculator 51, which has previously calculated the target output (PD_REQ) of the electric motor 10 on the basis of the first output limit ($L_1$) as the upper limit, calculates the target output (PD_REQ) using the second output limit ($L_2$) as the upper limit. Therefore, the output of the electric motor 10 can be increased in accordance with the driver's intention of abruptly accelerating the fuel cell vehicle.

While the requested output (PD_CAL) exceeds the first output limit ($L_1$) in STEP 10, the process branches from STEP 11 to STEP 20. Until the time set by the timer is up, namely, the assist time is elapsed, the process branches from STEP 20 to STEP 7. Accordingly, the upper-limit target output (PD_LMT) is held at the second output limit ($L_2$), so that the output of the electric motor 10 can be higher than the first output limit ($L_1$).

When the time set by the timer is up in STEP 20, the process proceeds to STEP 21. The upper-limit target output determining unit 52 performs a process of reducing the upper-limit target output (PD_LMT) stepwise by a predetermined decreasing amount ($\Delta$PD) to reduce the upper-limit target output (PD_LMT) at a predetermined rate of decrease. In other words, in STEP 21, when subtracting the decreasing amount ($\Delta$PD) from the current upper-limit target output (PD_LMT), the upper-limit output determining unit 52 checks whether the upper-limit target output is equal to or lower than the second output limit ($L_2$) (PD_LMT–$\Delta$PD$\leq L_2$).

If NO (PD_LMT–$\Delta$PD>$L_2$), the process proceeds to STEP 22 and the decreasing amount ($\Delta$PD) is subtracted from the current upper-limit target output to set the new upper-limit target output (PD_LMT). Consequently, the upper-limit target output (PD_LMT) is reduced stepwise as much as the decreasing amount ($\Delta$PD) until PD_LMT–$\Delta$PD$\leq L_2$ in STEP 21.

If PD_LMT–$\Delta$PD$\leq L_2$ in STEP 21, the process branches to STEP 30. The upper-limit target output determining unit 52 resets a flag (flag=0) and then returns the upper-limit target output (PD_LMT) to the first output limit ($L_1$) in the next STEP 31.

As mentioned above, after the assist time is elapsed, the upper-limit target output (PD_LMT) is gradually returned to the first output limit ($L_1$) at the predetermined decreasing rate. Consequently, the output of the electric motor 10 can be prevented from abruptly decreasing after the assist time.

According to the present embodiment, the upper-limit target output (PD_LMT) is set to the second output limit ($L_1$) until the assist time is elapsed. When a time during which the upper-limit target output (PD_LMT) is set to the second output limit ($L_2$) is determined within the assist time, the advantages of the present invention can be obtained.

Figure 5:
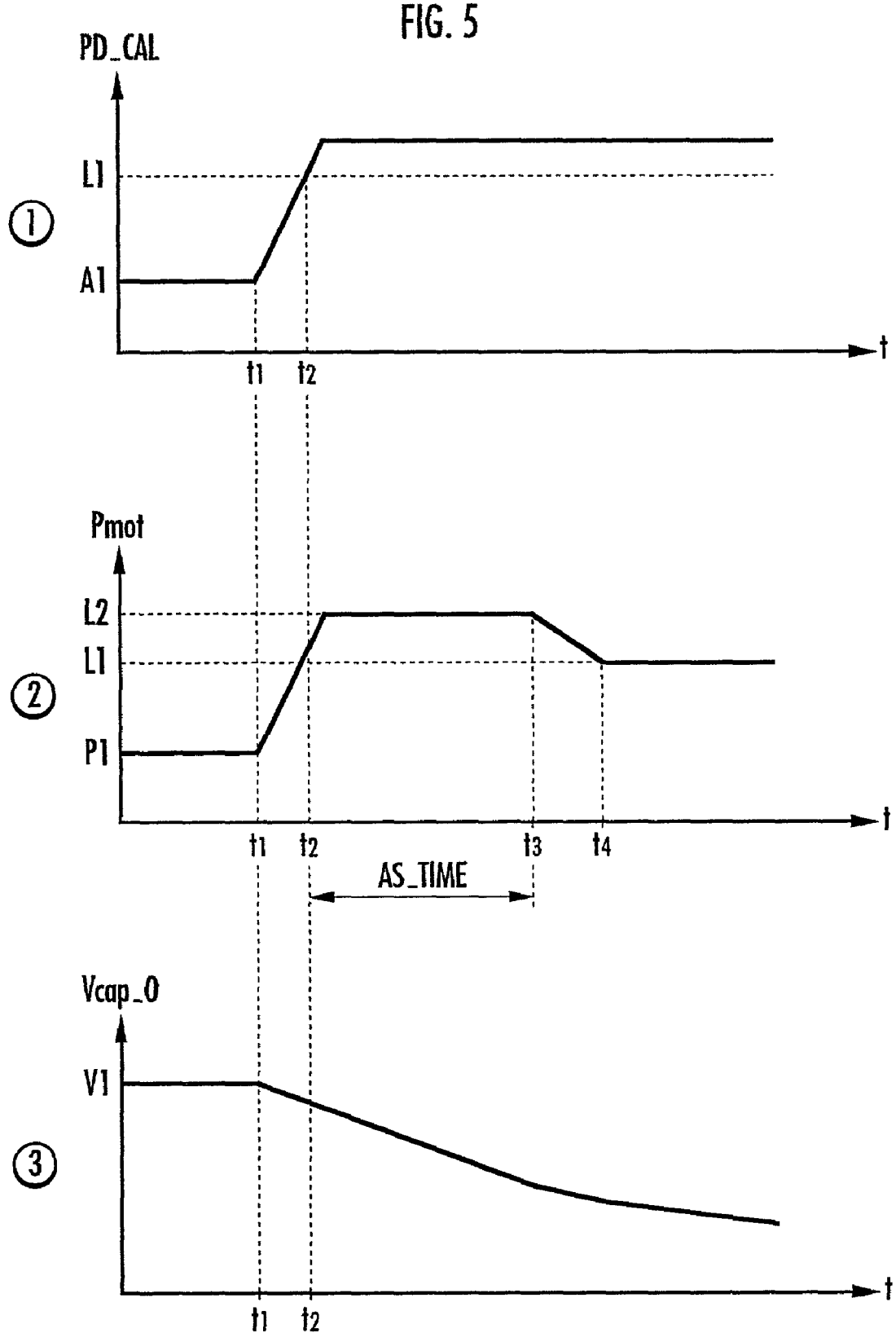
FIG. 5 includes time series graphs (1) to (3) showing the operation and the state of the control device during the assist time and before and after the assist time.
Figure 6:
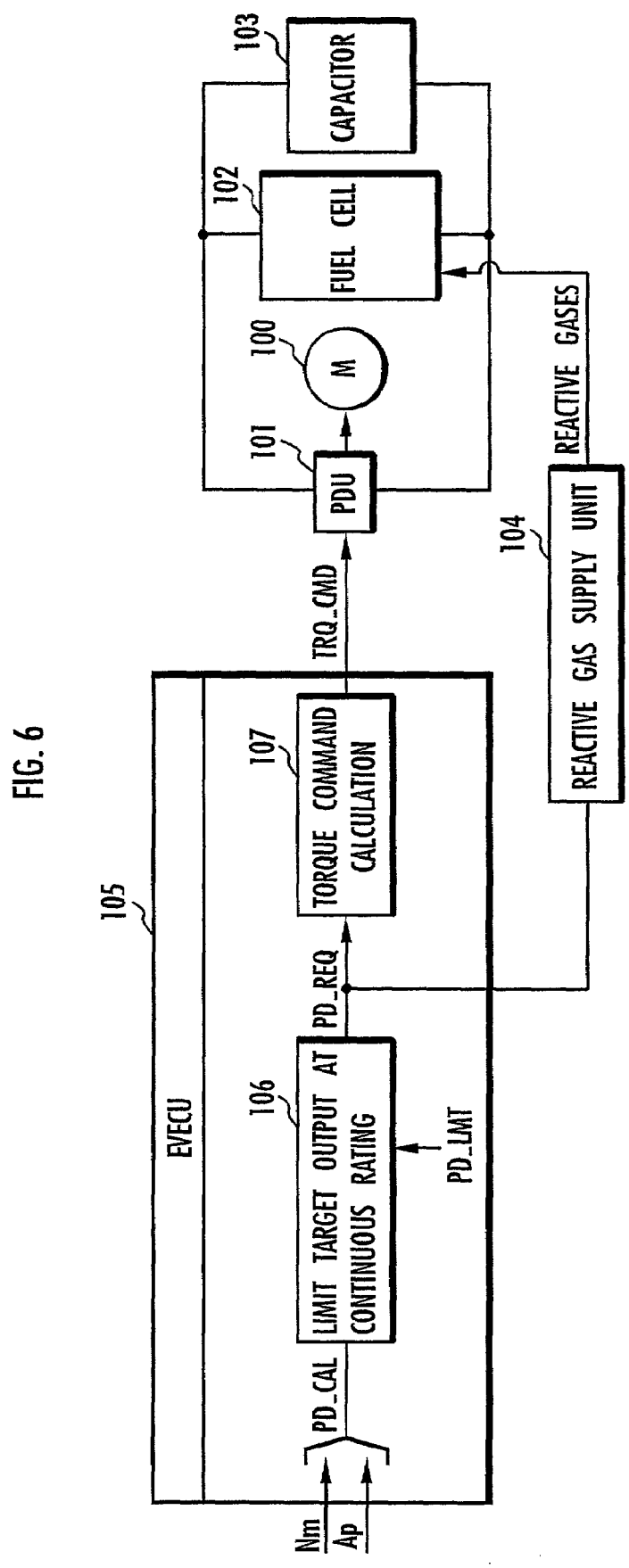
FIG. 6 is a block diagram showing the configuration of a conventional control device for a fuel cell vehicle.

FIG. 5 includes the graphs (1) to (3) showing the change of the output of the electric motor 10 in the case where the upper-limit target output (PD_LMT) is changed from the first output limit ($L_1$) to the second output limit ($L_2$) only within the assist time as mentioned above. The graph (1) shows the change of the requested output (PD_CAL), the graph (2) shows the change of an output (Pmot) of the electric motor 10, and the graph (3) shows the change of the open-circuit voltage (Vcap_o) of the capacitor 3.

In the graph (1), at time $t_1$, the requested output (PD_CAL) at a level $A_1$ starts to abruptly increase at an increasing rate higher than the reference increasing rate. When the requested output exceeds the first output limit ($L_1$) at time $t_2$, the upper-limit target output determining unit 52 switches the upper-limit target output (PD_LMT) which has previously been set to the first output limit ($L_1$) to the second output limit ($L_2$).

Consequently, as shown in the graph (2), the output of the electric motor 10 exceeds the first output limit ($L_1$) for a period until an assist time (AS_TIME) is elapsed after time $t_2$. The upper-limit target output determining unit 52 reduces the upper-limit target output (PD_LMT) at the predetermined decreasing rate after time $t_3$ at which the assist time (AS_TIME) is elapsed up to time $t_4$ at which the output is set to the first output limit ($L_1$). Accordingly, as shown in the graph (2), the output of the electric motor 10 decreases gradually after time $t_3$ to time $t_4$.

The electric energy discharged from the capacitor 3 is consumed by the motor driver 5 for the output of the electric motor 10 exceeding the first output limit ($L_1$) from time $t_2$ to time $t_4$. Accordingly, as shown in the graph (3), the open-circuit voltage (Vcap_o) of the capacitor 3 decreases after time $t_2$.

According to the present embodiment, the upper-limit target output determining unit 52 performs the process of reducing the upper-limit target output (PD_LMT) at the predetermined decreasing rate after the assist time. The advantages of the present invention are effective even if such a process is not performed.

According to the present embodiment, the requested-output calculator 50 calculates the requested output (PD_CAL) of the electric motor 10 on the basis of two parameters, namely, the amount of depression (Ap) of the accelerator pedal 13 and the rotational speed (Nm) of the electric motor 10. The requested output (PD_CAL) of the electric motor 10 may be calculated on the basis of any one of the parameters, for example, only the amount of depression (Ap) of the accelerator pedal 13.

Although a certain preferred embodiment of the present invention has been shown and described in detail, it should be understood that various changes and modifications may be made therein without departing from the scope of the appended claims.

What is claimed is:

1. A control device for a fuel cell vehicle, comprising:
   motor-requested-output determining means for determining a requested output for a driving electric motor;
   motor-target-output calculating means for calculating a target output of the electric motor while limiting the target output to a predetermined upper-limit target output or lower depending on the requested output;
   motor driving means for outputting a driving electric energy depending on the target output to the electric motor;
   a fuel cell which is used as a power supply for the motor driving means;
   an electric double layer capacitor which is connected parallel to the fuel cell so as to be charged by the fuel cell and to be discharged for compensation for the insufficient amount of generated electric energy when the amount of electric energy generated by the fuel cell is insufficient;
   reactive gas supply means for supplying reactive gases at a rate depending on the target output to the fuel cell;
   capacitor-charging-amount recognizing means for recognizing the amount of electric energy charged into the electric double layer capacitor; and
   assist time calculating means for calculating an assist time used as a time during which the electric motor can be operated continuously by the requested output on the basis of the requested output and the amount of electric energy charged into the electric double layer capacitor in an abruptly increasing state of the requested output in which the requested output exceeds a first output limit and an increasing rate of the requested output exceeds a predetermined reference increasing rate, the first output limit being determined in accordance with a continuous output rating of the electric motor or the motor driving means, wherein
   when the requested output is not in the abruptly increasing state, the motor-target-output calculating means sets the first output limit to the upper-limit target output, and when the requested output is in the abruptly increasing state, the motor-target-output calculating means sets a second output limit larger than the first output limit to the upper-limit target output within the assist time, the second output limit being determined in accordance with a short-time output rating of the motor driving means or the electric motor.

2. The device according to claim 1, wherein the motor-target-output calculating means reduces the upper-limit target output to the first output limit at a predetermined decreasing rate after the assist time has passed.

* * * * *